(12) United States Patent
Saito (10) Patent No.: US 8,284,468 B2
(45) Date of Patent: Oct. 9, 2012

(54) AUTHENTICATING MEDIUM AND AUTHENTICATABLE SUBSTRATE

(75) Inventor: Tae Saito, Tokyo (JP)

(73) Assignee: Dai Nippon Printing Co., Ltd., Tokyo (JP)

(\*) Notice: Subject to any disclaimer, the term of this patent is extended or adjusted under 35 U.S.C. 154(b) by 475 days.

(21) Appl. No.: 12/440,549

(22) PCT Filed: Sep. 11, 2006

(86) PCT No.: PCT/JP2006/318452
§ 371 (c)(1),
(2), (4) Date: Jul. 23, 2009

(87) PCT Pub. No.: WO2008/032411
PCT Pub. Date: Mar. 20, 2008

(65) Prior Publication Data
US 2009/0284813 A1   Nov. 19, 2009

(51) Int. Cl.
*G03H 1/00* (2006.01)
(52) U.S. Cl. .......................................................... 359/2
(58) Field of Classification Search .................. None
See application file for complete search history.

(56) References Cited

U.S. PATENT DOCUMENTS
2007/0159671 A1   7/2007   Hoshino et al.

FOREIGN PATENT DOCUMENTS

| EP | 0 911 758 A2 | 4/1999 |
|---|---|---|
| EP | 1 628 147 A1 | 2/2006 |
| JP | 2000-255200 A | 9/2000 |
| JP | 2005-088381 A | 4/2005 |
| JP | 2005-297449 A | 10/2005 |
| JP | 2006-153990 A | 6/2006 |

OTHER PUBLICATIONS

Machine Translation of JP 2005-088381 A.*
Machine Translation of JP 2006-153990 A.*

\* cited by examiner

*Primary Examiner* — Derek S Chapel
(74) *Attorney, Agent, or Firm* — Sughrue Mion, PLLC (57) ABSTRACT

An authenticating medium that includes a hologram which is used for authentication or other purposes thereby making more complicated appearance and ease of authentication unnecessary. The medium includes a cholesteric liquid crystal layer (3) on an upper or lower surface of a transparent substrate (2), a hologram-formation layer (4) on a lower surface thereof, and reflective metal layers (5) along the fine relief of the hologram-formation layer (4). The reflective metal layers (5) are formed in a patterned form, as viewed from above, thereby obtaining an authenticating medium (1) capable of solving problems with the prior art. The cholesteric liquid crystal layer may be provided in a double-layer form, and may further have an adhesive layer (7) on the bottom.

4 Claims, 4 Drawing Sheets

5 Reflective metal layers

FIG. 4(a)

Fine pattern

FIG. 4(b)

Fine pattern

FIG. 5(a)

4 Hologram-formation layer

FIG. 5(b)

4 Hologram-formation layer

6 Water-soluble resin pattern

FIG. 5(c)

4 Hologram-formation layer
6 Water-soluble resin pattern
5 Reflective metal layers

FIG. 5(d)

4 Hologram-formation layer

5 Reflective metal layers

AUTHENTICATING MEDIUM AND AUTHENTICATABLE SUBSTRATE

TECHNICAL ART

The present invention relates generally to an authenticating medium capable of being applied to, for instance, ID cards to improve their counterfeit resistance, and more particularly to an authenticatable substrate capable of being used in a variety of applications with such an authenticatable medium applied to them.

BACKGROUND ART

For the purpose of authentication of whether or not a certain article is genuine, an authenticating seal has often been applied to that article. For instance, a hologram seal comprising a seal form of hologram has been used frequently, because advanced technologies are needed for hologram fabrication. Now that holograms have been long used, however, there are no small illegal attempts. In this sense, there is mounting demand for holograms that are more difficult to forge.

Another demand for holograms is to be capable of being authenticated by simple means. For instance, take credit cards that are a sort of ID cards. A variety of credit cards are available and used in various applications. However, judgment of whether or not a certain credit card is genuine is often implemented by salesclerks, rather than experts, and so an authenticating method that is simpler and takes no much time is still in great need.

So far, it has been proposed to metalize a part of hologram by evaporation means thereby giving diffracted light or a hologram image depending on the metalized portion (see Patent Publication 1).

It has also been tried to combine hologram with colesteric liquid crystals thereby adding their effect of changing in colors depending on the angle of viewing as well as their polarization effect. For instance, there has been an authenticating structure put forward wherein a fine hologram relief is formed on a cholesteric liquid crystal layer itself, and the fine hologram relief is filled up with a thermosetting resin or ionized radiation-curable resin to make up for heat resistance, preferably with a layer colored in a dark or deep color (see Patent Publication 2).

Patent Publication 1: JP(A)4-104188
Patent Publication 2: JP(A)2003-185835

With the invention set forth in Patent Publication 1, a pattern resulting from the presence or absence of the metalized layer could be added to the hologram, and with the invention disclosed in Patent Publication 2, the effect of cholesteric liquid crystals on color changes depending on the angle of viewing could be added to the hologram. However, in the former, there are merely areas where the hologram can be seen and areas where the hologram cannot, and in the latter, the hologram is not only hard to see but also there are only the effects of the cholesteric liquid crystal layer added to the entire surface of the hologram. In either case, therefore, more complicated appearance and ease of authentication are still in need.

SUMMARY OF THE INVENTION

A primary object of the invention is to provide a novel authenticating medium that comprises a hologram used for authentication or other purposes, and makes more complicated appearance and ease of authentication unnecessary.

Through inventors' studies, there can now be an authenticating medium obtained wherein, while a hologram is combined with a separate cholesteric liquid crystal layer, a reflective metal layer with which the hologram is associated is patterned, whereby, at a site where the reflective metal layer is present as a bottom layer, ease of viewing the hologram is ensured, and at a site where none of the reflective metal layer is present as the bottom layer, there is an effect of cholesteric liquid crystals on color changes depending on the angle of viewing, and the medium can have a more complicated appearance where both effects are delimited in a patterned form.

The first invention relates to an authenticating medium, characterized by comprising a cholesteric liquid crystal multilayer structure comprising a cholesteric liquid crystal layer laminated on at least one side of a transparent substrate, wherein a hologram-formation layer having a fine hologram relief formed on a surface of a transparent resin layer is laminated on a non-viewing side of said cholesteric liquid crystal multilayer structure, and reflective metal layers are laminated in a pattern form on a surface of said hologram-formation layer with the fine relief formed on it.

The second invention relates to the authenticating medium according to the first invention, characterized in that said cholesteric liquid crystal multilayer structure has said cholesteric liquid crystal layers laminated on a viewing side of said transparent substrate.

The third invention relates to the authenticating medium according to the first invention, characterized in that said cholesteric liquid crystal multilayer structure has said cholesteric liquid crystal layers laminated on the non-viewing side of said transparent substrate.

The fourth invention relates to the authenticating medium according to the first invention, characterized in that said cholesteric liquid crystal multilayer structure has said cholesteric liquid crystal layers laminated on each of the viewing side and the non-viewing side of said transparent substrate.

The fifth invention relates to the authenticating medium according to any one of the first to fourth inventions, characterized in that at least a part of said cholesteric liquid crystal layers is in a patterned form.

The sixth invention relates to the authenticating medium according to any one of the first to fifth inventions, characterized in that an adhesive layer is laminated on said reflective metal layers side of the authenticating medium.

The seventh invention relates to an authenticatable substrate, characterized in that an authenticating medium as recited in any one of the first to fifth inventions has said reflective metal layers laminated on another substrate.

The eighth invention relates to an authenticatable substrate, characterized in that an authenticating medium as recited in any one of the first to fifth inventions is visibly buried in another substrate.

With the first invention, the hologram-formation layer and the cholesteric liquid crystal layer are provided as separate layers, and the reflective metal layers are laminated in a patterned form on the surface of the hologram-formation layer with the fine relief formed on it. Thus, at a site where the reflective metal layers are present as a bottom layer the hologram is easily visible, and at a site where none of the metal reflective layers is present as the bottom layer, the effect of cholesteric liquid crystals on color changes depending on the angle of viewing is easily observable. Further, if the authenticating medium is viewed by way of a right-handed or left-handed polarizing sheet, it is possible to check up the presence or absence of right-handed or left-handed polarized light. Furthermore, upon viewing, the site where the hologram is easily visible and the site where the effect of the cholesteric liquid crystal layer is easily checked up are delimited in a patterned form. It is thus possible to provide an authenticating medium that has a more complicated appearance and is greatly capable of authentication.

According to the second invention, in addition to the advantage of the first invention, there is another advantage obtained that the effect resulting from the cholesteric liquid crystals is much more easily checked up, because the cholesteric liquid crystal layers are laminated on the viewing side of the transparent substrate.

According to the third invention, in addition to the advantage of the first invention, there is another advantage obtained that the authenticating medium can have a much higher protection on the surface of the cholesteric liquid crystal layer, because there is the transparent substrate on the viewing side.

According to the fourth invention, in addition to the advantage of the first invention, there is another advantage obtained that the effect on color changes depending on the angle of viewing gets more implicated through the use of cholesteric liquid crystal layers having different characteristics, because two such cholesteric liquid crystal layers are laminated on both surfaces of the transparent substrate.

According to the fifth invention, in addition to the advantages of the first to fourth inventions, there is yet another advantage is obtained that because at least a part of the cholesteric liquid crystal layer is provided in a patterned form, the effect on color changes depending on the angle of viewing is obtained depending on that pattern.

According to the sixth invention, there is an authenticating medium for easy application to articles, which can have the advantage of any of the first to fifth inventions.

According to the seventh invention, there is an authenticatable substrate provided, which can have the advantage of any of the first to fifth invention, because the authenticating medium of any of the first to fifth invention is laminated on the substrate.

According the eighth invention, there is an authenticatable substrate provided, which can have the advantage of any of the first to fifth invention, because the authenticating medium of any of the first to fifth invention is laminated on the substrate.

BRIEF DESCRIPTION OF THE DRAWINGS

FIG. 1 is illustrative of the fundamental multilayer structure of an authenticating medium.

FIG. 2 is illustrative of another multilayer structure of the authenticating medium.

FIG. 3 is illustrative of one pattern of reflective metal layers of the authenticating medium.

FIG. 4 is illustrative of another pattern of the reflective metal layers of the authenticating medium.

FIG. 5 is illustrative of one process of forming the reflective metal layer pattern.

FIG. 6 is illustrative of another process of forming the reflective metal layer pattern.

FIG. 7 is illustrative of a substrate having the authenticating medium applied to it.

FIG. 8 is illustrative of a substrate having a thread form of authenticating medium applied to it.

FIG. 9 is illustrative of a substrate having a thread form of authenticating medium buried in it.

BEST MODE FOR CARRYING OUT THE INVENTION

FIGS. 1 and 2 are illustrative of the multilayer structures of the authenticating medium according to the invention. FIGS. 3 and 4 are illustrative of the reflective metal layer patterns in the authenticating media shown in FIGS. 1 and 2: FIG. 4 in particular is illustrative of a fine pattern. FIGS. 5 and 6 are illustrative of the processes of forming the reflective metal layer patterns. FIGS. 7, 8 and 9 are illustrative of separate substrates to which the inventive authenticating medium is applied.

Figure 1A:
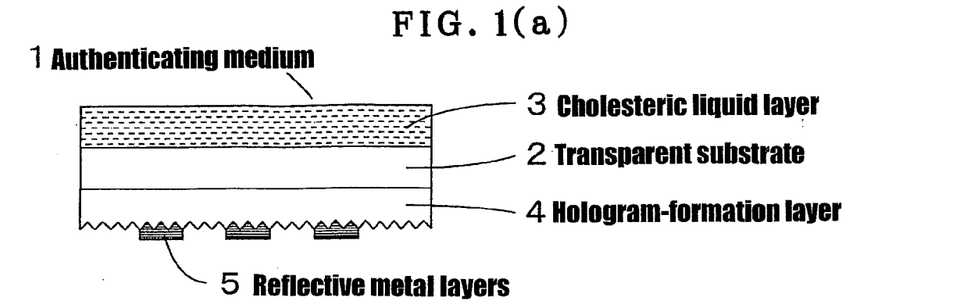

As shown in FIG. 1(*a*), an inventive authenticating medium 1 comprises a cholesteric liquid crystal layer 3 laminated on one or upper side of a transparent substrate 2, and a hologram-formation layer 4 of transparent resin laminated on another or lower side of the transparent substrate 2, wherein the hologram-formation layer 4 is provided with a fine hologram relief on its bottom surface. Note here that the upper and lower sides or surfaces are defined by those of each drawing, and in the inventive authenticating medium, the upper side provides a viewing side. Further, the hologram-formation layer 4 has a reflective metal layers 5 laminated in a patterned form along that fine relief. As the cholesteric liquid crystal layer 3 is laminated on the viewing side of the transparent substrate 2 like the authenticating medium 1 shown in FIG. 1(*a*), the effect resulting from the cholesteric liquid crystal layer 3 can more easily be observed.

Figure 1B:
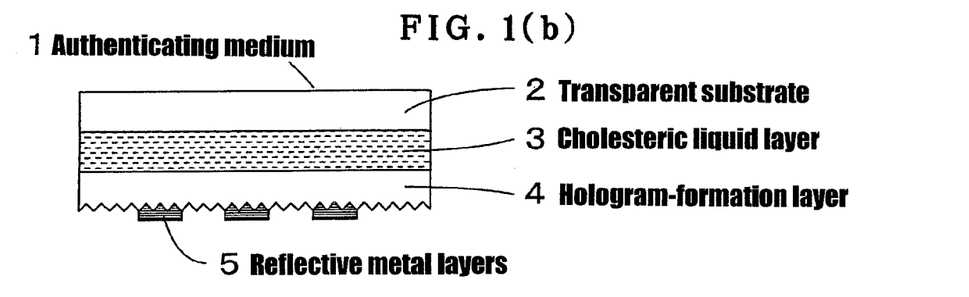

As shown in FIG. 1(*b*), the inventive authenticating medium 1 may have the cholesteric liquid crystal layer 3 laminated on the lower surface side of the transparent substrate 2. In this case, the hologram-formation layer 4 is laminated on the lower surface side of the cholesteric liquid crystal layer 3, and the pattern form of reflective metal layers 5 is further laminated on the bottom surface of the hologram-formation layer 4. Thus, as the cholesteric liquid crystal layer 3 is laminated on the non-viewing side of the transparent substrate 2, it permits the effect on protection of the surface (upper side) of the cholesteric liquid crystal layer 3 to be more enhanced because the transparent substrate 2 provides the viewing side.

Figure 2A:
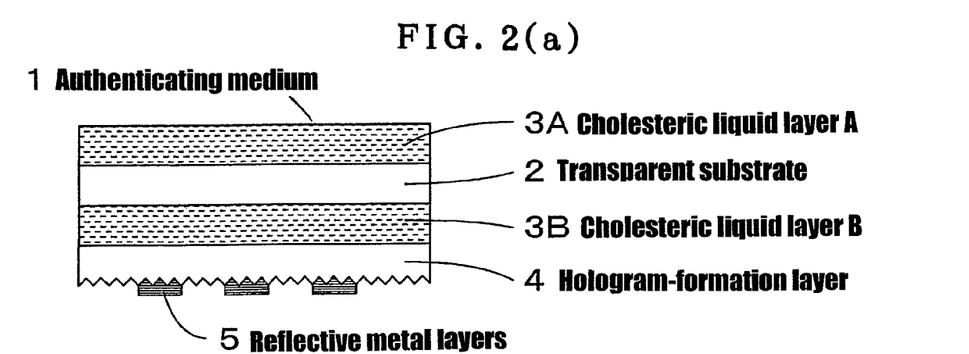

As shown in FIG. 2(*a*), the inventive authenticating medium 1 may comprise two cholesteric liquid crystal layers A and B (3A and 3B) laminated on both surfaces of the transparent substrate 2: the cholesteric liquid crystal layer A (3A) is laminated on the viewing side of the transparent substrate 2 and the cholesteric liquid crystal layer B (3B) is laminated on the non-viewing side. A hologram-formation layer 4 and a pattern form of reflective metal layers 5 are laminated on the lower surface of the cholesteric liquid crystal layer 3B. Thus, as the cholesteric liquid crystal layers A (3A) and B (3B) are laminated with the transparent substrate 2 held between them, the effect of changing in colors depending on the angle of viewing allows for the provision of a more complicated authenticating medium. As compared with both the cholesteric liquid crystal layers A and B laminated on the same side of the transparent substrate 2, there is another advantage obtained that it is possible to avoid a solvent in the cholesteric liquid crystal composition used at the lamination step having adverse influences on the previously laminated cholesteric liquid crystal layer.

Figure 2B:
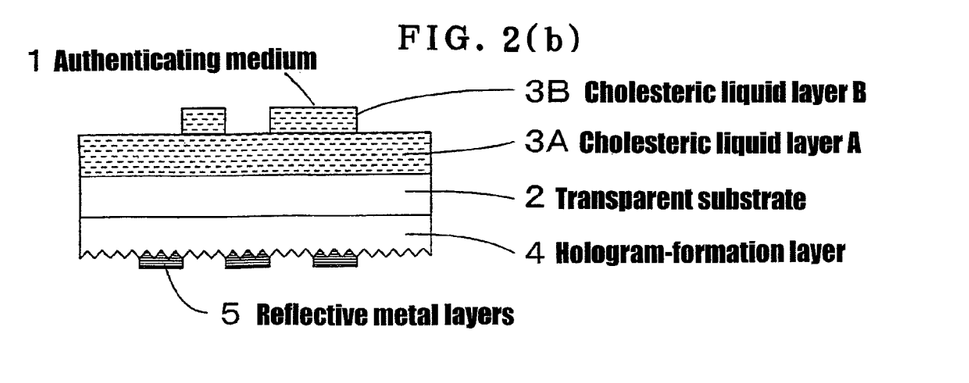

As shown in FIG. 2(*b*), the inventive authenticating medium 1 may have the cholesteric liquid crystal layer A (3A) laminated on the viewing side of the transparent substrate 2 and the pattern form of cholesteric liquid crystal layers B (3B) laminated on the viewing side of the cholesteric liquid crystal layer A (3A). There are then the hologram-formation layer 4 and the pattern form of reflective metal layers 5 laminated on the lower surface of the transparent substrate 2. Note here that the pattern form of cholesteric liquid crystal layer B (3B) laminated can have some variations. For instance, the cholesteric liquid crystal layers A (3A) and B (3B) may be reversed in the order of lamination or, alternatively, only the pattern form of cholesteric liquid crystal layer B (3B) may be used without the cholesteric liquid crystal layer A (3A).

In the foregoing explanation, the cholesteric liquid crystal layers A (3A) and B (3B) are laminated on the viewing side of the transparent substrate 2, but they may be laminated on the non-viewing side of the transparent substrate 2. Alternatively, the cholesteric liquid crystal layer A (3A) and the pattern form of cholesteric liquid crystal layer B (3B) may be laminated with the transparent substrate 2 held between them, not on the same side of the transparent substrate 2: they may separately be laminated on both sides of the transparent substrate 2. Thus, as at least a part of the cholesteric liquid crystal layers is in a patterned form, the effect of changing in colors depending on the angle of viewing is obtainable at least depending on that pattern.

Figures 3A, 3B:
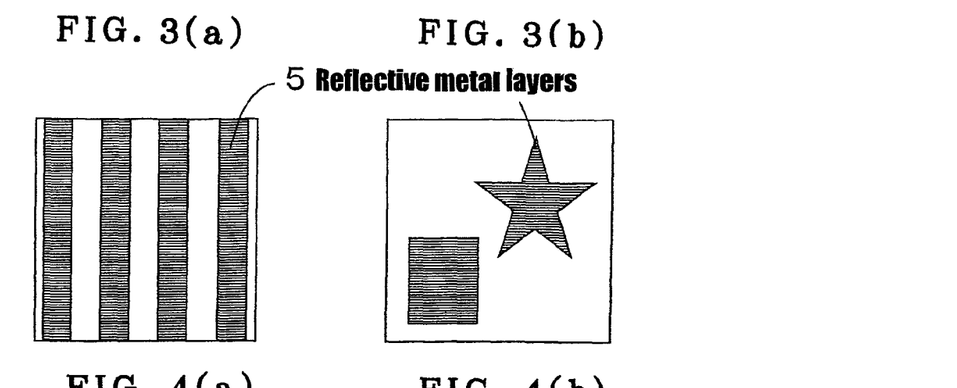

FIG. 3 is illustrative of a planar exemplar of the pattern form of reflective metal layers 5 laminated. As shown in FIG. 3(a), the pattern may be a streaky one comprising reflective metal layers of rectangular shape, each one having a width narrow in the horizontal direction and a length long in the vertical direction, arranged at an equal interval, for instance, at an interval equal to the horizontal length (i.e., width) of each rectangle. As shown in FIG. 3(b), alternatively, the reflective metal layers 5 may each be of a geometrical shape (rectangular, and star shapes in FIG. 3(b)). The pattern may be a negative one of such a specific positive pattern. Note here that these patterns are given by way of example only: they may freely be determined primarily from an aesthetic point of view. That is, they may be of any desired shape inclusive of non-geometrical characters or symbols. In addition, the pattern may be in tune with the hologram of the hologram-formation layer 4.

Pattern size may be enough to be resolved by the naked eye. However, to observe that the cholesteric liquid crystals change in colors depending on the angle of viewing, a colored layer 6 may have a rectangular shape of at least 1 mm×1 mm in length and width, preferably at least 3 mm×3 mm, and more preferably at least 5 mm×5 mm. When it comes to a geometrical shape, the colored layer 6 may have a circular shape of at least 1 mm in diameter, preferably at least 3 mm, and more preferably at least 5 mm. When it comes to other shapes, the colored layer 6 may have an inscribed circular shape of at least 1 mm in diameter, preferably at least 3 mm, and more preferably at least 5 mm.

Figures 4A, 4B:
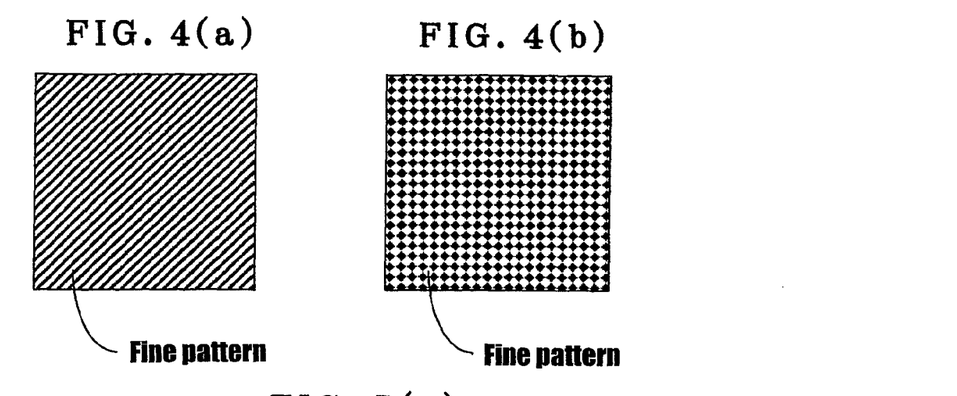

As shown in FIGS. 4(a) and 4(b), the reflective metal layers 5 may be laminated in a fine pattern form. In this case, the reflective metal layers 5 comprising lines of finite width running from the lower left to the upper right may provide a fine line pattern arranged at a pitch twice that width in the width direction. Alternatively, the fine pattern may be an arrangement wherein the reflective metal layers 5 configured into a fine circular or rectangular shape are arranged at an equal pitch, as shown in FIG. 4(b).

These fine patterns are given by way of example only, and the pattern that constitutes the fine pattern may freely be determined in itself: use may be made of geometrical patterns or character or symbols patterns in addition to the line or dot patterns. Preferably, the size of the pattern that constitutes the fine pattern is hardly or never observable by usual observing means. When it comes to the line pattern, a line may have a width of up to 0.3 mm, preferably up to 0.1 mm; although it has a considerably small width as long as it can be formed, the line should practically and preferably have a width of about 0.01 mm or more. When it comes to a circular dot, it should have a diameter of up to 0.3 mm, preferably up to 0.1 mm, and more preferably about 0.01 mm or more. When it comes to a rectangular dot, it should have a length and width of up to 0.3 mm×0.3 mm, preferably up to 0.1 mm×0.1 mm, and more preferably about 0.1 mm×0.01 mm or greater. When it comes to other shapes, an inscribed circle should have a diameter of up to 0.3 mm, preferably up to 0.1 mm, and more preferably about 1.01 mm or greater.

When the pattern is a fine one, a contour pattern (a square contour in FIG. 4(a) or 4(b)) that is the shape of a zone with the fine pattern formed in it, too, may freely be set, and may be in tune with the design of the hologram of the hologram-formation layer 4.

The reflective metal layers 5 constitute a fine pattern, the area share of the reflective metal layers 5 is preferably 20% to 80%, and more preferably 30% to 60%.

When the reflective metal layers 5 are provided in a patterned form, at a site where there are the reflective metal layers 5, the hologram of the hologram-formation layer 4 is well seen, and at a site where there is none of the reflective metal layers 5, the hologram is not well seen: it is observed that due to the presence of the cholesteric liquid crystal layer 3 colors change depending on the angle of viewing. When the reflective metal layers are provided in a finely patterned form, within the zone where there is the fine pattern, i.e., the contour pattern, the hologram is not only seen, but it is also observed that due to the presence of the cholesteric liquid crystal layer 3 colors change depending on the angle of viewing.

The inventive authenticating medium 1 has such a basic multilayer structure as described above, and that basic multilayer structure may be used as such. However, there is another way of applying that authenticating medium 1 to another substrate, thereby giving authentication capability to it.

When the authenticating medium 1 is applied to another substrate, it may have an adhesive layer laminated on the bottom surface of what is explained with reference to FIG. 1 or FIG. 2. The lamination of such an adhesive layer has another merit of making application easy, because there is no need of individual application of the adhesive whenever the authenticating medium 1 is applied to a variety of articles.

With the inventive authenticating medium 1 explained with reference to FIGS. 1-4 and applied to a variety of articles, any one of the respective layers constituting the authenticating medium 1 may be formed of relatively fragile material or the adhesion between the adjacent layers may be weakened so that when the forcible peeling of it off the associated article is attempted, it is going to break down, ensuring that there is no possible chance of peeling it off the associated article with an illegal intention and pasting it to another article: there is no possible chance of the so-called re-pasting. For instance, a poorly adhesive or fragile material may be interposed between the transparent substrate 2 and the hologram-formation layer 4, thereby making the adhesion between both so low that when the forced peeling of the applied authenticating medium 1 is attempted, it is going to break down.

For the transparent substrate 2 of the authenticating medium 1, it is preferable to use a substrate that has mechanical strength as well as solvent resistance and heat resistance good enough to stand up processing during production or application to another article. Not by way of limitation and depending on what purpose it is used for, preference is given to plastics in a film or sheet form. For instance, there may be the mention of various plastic films such as ones based on polyethylene terephthalate (PET), polycarbonate, polyvinyl alcohol, polysulfone, polyethylene, polypropylene, poly-styrene, polyarylate, triacetyl cellulose, diacetyl cellulose, and polyethylene/vinyl alcohol.

Whenever necessary, it is preferable to provide an orientation film on the side of the transparent substrate 2 with the cholesteric liquid crystal layer 3 laminated on it. Any orientation film may be used as long as it is generally usable for that purpose; for instance, use may be made of an orientation film based on polyvinyl alcohol resin (PVA), polyimide resin or the like. The orientation film may be provided by coating a solution of these resins in a solvent to the surface of such transparent substrate 2 as described above by suitable coating means, drying it, and rubbing the resultant matter by means of cloth, a brush or the like.

The cholesteric liquid crystal layer 3 of the inventive authenticating medium 1 is used either in a form wherein a thread having a high-molecular cholesteric liquid crystal layer is made into a substrate paper or in a form wherein an authenticating medium having a high-molecular cholesteric liquid crystal layer is laminated on, and integrated with, the substrate. In either form, the high-molecular cholesteric liquid crystal layer is formed on the aforesaid polyethylene terephthalate or other plastic film by preparing high-molecular cholesteric liquid crystals into an ink, and printing it on the substrate by means of intaglio printing such as gravure printing, lithographic printing such as offset printing, letterpress printing, screen printing and so on. Whenever necessary, an orientation film may be provided on the side of the plastic film substrate with the high-molecular cholesteric liquid crystal layer laminated on it. Any orientation film may be used as long as it is generally usable for that purpose; for instance, use may be made of an orientation film based on polyvinyl alcohol resin (PVA), polyimide resin or the like. The orientation film may be provided by coating a solution of these resins in a solvent to the surface of the plastic film substrate by suitable coating means, drying it, and rubbing the resultant matter by means of cloth, a brush or the like.

The thus formed high-molecular cholesteric liquid crystal layer has preferably a thickness of about 1 µm to 20 µm; in terms of mass per unit area, there are about 1 to 20 grams/m² on drying. Too small thicknesses make the cholesteric liquid crystal unable to sufficiently show two unique properties: circular polarization selectivity and selective reflectivity, and too large thicknesses cause a decrease in the orientation of the liquid crystals, resulting in a decrease in their adhesion to the substrate and working against cost as well. The high-molecular cholesteric liquid crystal layer may be not only in a single layer form but also a double or multilayer form. Note here that the ink of the aforesaid cholesteric liquid crystals is commercially available under the name of, for instance, "HELICONE (registered trademark)" that is a cholesteric liquid crystal made by Wacker Chemie GmbH.

The cholesteric liquid crystal used herein has such a regular twist as to permit its orientation to have a spiral structure in the thickness direction, and it is well known that when the pitch P (the thickness necessary for the 360° rotation of a liquid crystal molecule) is substantially equal to the wavelength λ of incident light, the high-molecular cholesteric liquid crystal shows two optical properties: selective reflectivity and circular polarization selectivity (see "Liquid Crystals & Fundamentals of Application to Displays", published by Corona Co., Ltd.)

The selective reflectivity here refers to the optical nature capable of strongly reflecting light within a specific wavelength band of the incident light. This selective reflectivity appears in the specifically limited wavelength band so that by proper choice of the pitch P of the high-molecular cholesteric liquid crystal, the reflected light is going to be colored with high color purity. Here suppose Xs to be the center wavelength of that band, and $\Delta\lambda$ to be the band width. These are then determined from the pitch P ($=\lambda/nm$) and average refractive index nm ($=\sqrt{((ne^2+no^2)/2)}$) of an optical medium, as represented by the following equations (1) and (2). Here $\Delta n$ is a difference ($\Delta n=ne-no$) between the extraordinary index ne and the ordinary index no in plane of the optical medium.

$$\lambda s = nm \cdot P \quad (1)$$

$$\Delta\lambda = \Delta n \cdot P / nm \quad (2)$$

The center wavelength λs and wavelength band width $\Delta \lambda$ shown in the aforesaid equations (1) and (2) are defined in the case where light is vertically incident on the high-molecular cholesteric liquid crystal layer (0° incidence, on-axis incidence). However, when light is obliquely incident (off-axis incidence), the pitch P decreases apparently, and so the center wavelength λs shifts to a shorter wavelength side, resulting in a decrease in the wavelength band width $\Delta\lambda$. This phenomenon is called the blue shift due to the fact that λs shifts to the shorter wavelength side, and the amount of that shift is dependent on the angle of incidence and can easily be visible. For instance, the reflection color of the high-molecular cholesteric liquid crystal that is seen in red when viewed from vertical (the 0° incidence) changes from red to orange, yellow, green, bluish green and blue in order as the angle of field of view grows large. Thus, the high-molecular cholesteric liquid crystal layer has its color shifting to the shorter wavelength side depending on the angle of viewing: it develops (changes in) a unique color that cannot be reproduced on color copiers, and so it is very effective for forge prevention.

Because the high-molecular cholesteric liquid crystal layer shows a unique reflection color, an authenticating medium-applied label may easily be visually authenticated. Further, because of its circular polarization selectivity, it reflects either of left-handed or right-handed circularly polarized light. Note here that the circular polarization selectivity refers to the optical nature capable of transmitting only circularly polarized light in a specific rotation direction and reflecting circularly polarized light in the opposite rotation direction. It is the nature unique and specific to the high-molecular cholesteric liquid crystal that of incident light, a circularly polarized light component in the same direction as the twist direction of the orientation structure of the high-molecular cholesteric liquid crystal is reflected and that rotation direction of that reflected light lies in the same direction, too, whereas a circularly polarized light component rotating in the opposite direction is transmitted through. A high-molecular cholesteric liquid crystal having a left-handed twist structure reflects left-handed circularly polarized light and the reflected light stays as left-handed circularly polarized light, whereas right-handed circularly polarized light transmits through it. On the other hand, a high-molecular cholesteric liquid crystal having a right-handed twist structure reflects right-handed circularly polarized light and the reflected light stays as right-handed polarized light, whereas left-handed circularly polarized light transmits through it.

The liquid crystal material used for the cholesteric liquid crystal layer 3 of the inventive authenticating medium 1, for instance, includes side-chain type polymers having a liquid crystal-formation group on side chains, e.g., polyacrylate, polymethacrylate, polysiloxane and polymalonate, and main-chain type polymers having a liquid crystal-formation group on a main chain, e.g., polyester, polyester amide, polycarbonate, polyamide and polyimide.

The high-molecular cholesteric liquid crystal layer in an oriented state has the nature of reflecting only either one of the left-handed or right-handed circularly polarized light component of incident light. It also has another effect of being seen in different hues depending on the angle of viewing. Therefore, the high-molecular cholesteric liquid crystal layer is capable of selectively reflecting light: in other words, it is a light selective reflection layer. This light selective reflection layer may be formed by applying a solution of cholesteric liquid crystals in a solvent by various printing processes, and drying it. Alternatively, polymerizable cholesteric liquid crystals may be prepared into an ultraviolet-polymerizable composition. The obtained ultraviolet-polymerizable composition is applied by various printing processes, dried, and irradiated with ultraviolet radiation for polymerization. Except that the light selective reflection layer comprising the cholesteric liquid crystal layer is seen in different hues depending on the aforesaid angle of viewing, it has seeing-through capability and, in that sense, it has transparency.

To achieve the oriented state, an ultraviolet radiation-polymerizable composition prepared using a solution of cholesteric liquid crystals in a solvent or polyermizable cholesteric liquid crystals may be applied to the surface of a stretched plastic sheet. In the alternative, the orientation film may be formed on the surface of an application member, and an ultraviolet radiation-polymerizable composition prepared using a solution of cholesteric liquid crystals in a solvent or polymerizable cholesteric liquid crystals may then be applied to it. When there are two or more light selective reflection layers provided, they may be formed in different thicknesses, different spiral pitches, etc. to give more complicated optical properties to them. Alternatively, they may be formed in a patterned arrangement so that one is in a uniform layer form and another is in a patterned form.

For the polymerizable cholesteric liquid crystal material, for instance, there may be the mention of compounds represented by the following general formula (1), and compounds as represented by the following formulae (2) to (10). Although the compounds exemplified here are monomers, they may be oligomers or polymers. The compounds represented by the general formula (1) may be used in combinations of two or more or, alternatively, two or more selected from the compounds represented by the general formula (1) and formulae (2) to (10) may be used in combinations of two or more.

In the aforesaid general formula (1), it is preferable that $R^1$ and $R^2$ each stand for hydrogen or a methyl group, and X is chlorine or a methyl group. It is also preferable that the small letters a and b indicative of the chain length of an alkylene group that is a spacer for the compounds represented by the general formula (1) is in the range of 2 to 9 for the purpose of allowing them to show liquid crystallinity.

The aforesaid liquid crystalline compounds may additionally contain chiral agents represented by the following formulae (11) to (13).

In the aforesaid formula (11), $R^3$ stands for hydrogen or a methyl group. In the aforesaid formulae (11) and (12), Y is any one of the following formulae (i) to (xxiv). In the aforesaid formulae (11), (12) and (13), the small letters c, d and e indicative of the chain length of the alkylene group is preferably in the range of 2 to 9 to let it develop liquid crystallinity.

The aforesaid cholesteric liquid crystal material and chiral agent may be blended optionally with an ultraviolet radiation polymerization initiator and further with a solvent and a diluent. Taking an example, the cholesteric liquid crystal material, chiral agent and ultraviolet radiation polymerization initiator are mixed together at a blend ratio of 100:5:5 (on a mass basis), and the obtained powders are dissolved in a solvent such as toluene into a coating solution having a concentration of about 30% by mass. Note here that the blend ratio may optionally be determined while taking into account the type of the cholesteric liquid crystal material, chiral agent or ultraviolet radiation polymerization initiator used, or the like, coating processes or machines, and the desired coating amount.

The high-molecular cholesteric liquid crystal layer may be of the type that reflects either left-handed or right-handed circularly polarized light, and use may be made of a liquid crystal material that shows different reflection colors even in the same direction as well. Referring here to how to form the high-molecular cholesteric liquid crystal material on the substrate, for instance, the aforesaid liquid crystal material is subjected to molecular orientation, irradiated with ultraviolet radiation for crosslinking, and pulverized into a pigment form of liquid crystal material, which is in turn dispersed in a vehicle or turned into an ink that is then applied by such known printing processes as mentioned above.

The light selective reflection layer may be constructed from not only the aforesaid high-molecular cholesteric liquid crystal layer but also a variety of materials. For instance, reliance may be on pigments that change in colors depending on the angle of viewing, evaporated thin-films or dichromatic dyes. The pigments that change in colors depending on the angle of viewing include a pearl pigment wherein a high-refractive-index layer of silicon oxide, titanium oxide, iron oxide or the like and a low-refractive-index layer of mica or the like are laminated together. Specifically, "Infinite Color" made by Shiseido Co., Ltd., "Iriodin" made by Merck Co., Ltd. (German), etc. are commercially available. The evaporated thin-film may be obtained by a vapor phase process from aluminum or other metals or other materials, and show the so-called inference colors just like a thin film of oil floating on the water. The dichromatic dye comprises a long-chain dye molecule that differs in light absorbency depending on the direction of a molecular axis; for instance, a light component in the normal direction to the molecular axis of the dye molecule transmits light through with no or little absorbency, whereas a light component parallel with the direction of the molecular axis absorbs light or does not transmit light through. The dichromatic dye, for instance, includes anthraquinone, azo or bisazo base ones. Of the aforesaid materials, the pigment that changes in colors depending on the angle of viewing or the dichromatic dye may be dispersed in a suitable binder resin and diluted with a solvent into a coating composition that is then applied to an application surface by means of silk screen printing, gravure printing or known coating processes.

The hologram-formation layer 4 has a fine hologram relief formed on its bottom surface, and the layer itself may be formed using a variety of materials capable of being processed into a fine relief such as thermosetting resins, thermoplastic resins, and ionized radiation-curable resins. For instance, the hologram-formation layer 4 may be formed of transparent thermoplastic resins such as polyvinyl chloride, acrylic acid ester resin (e.g., PMMA), acrylamide resin, nitrocellulose resin, and poly-styrene resin. Alternatively, it may be formed of thermosetting resins such as unsaturated polyester resin, acrylurethane resin, epoxy-modified acrylic resin, epoxy-modified unsaturated polyester resin, alkyd resin, and phenol resin. These resins may be used alone or in admixture and, if necessary, with various isocyanates, metal soaps such as cobalt naphthenate or zinc naphthenate, peroxides such as benzoyl peroxide or methyl ethyl ketone peroxide, and heat or ultraviolet radiation initiators such as benzophenone, acetophenone, anthraquinone, napthoquinone, azobisisobutyronitrile or diphenyl sulfide. The ionized radiation-curable resin, for instance, includes epoxy acrylate and acryl-modified polyester. If necessary, the ionized radiation-curable resin may contain other mono- or poly-functional monomer, oligomer or the like for the purpose of adjustment of crosslinked structure, viscosity, etc.

The fine hologram relief may be formed on the hologram-formation layer 4 by a process wherein a master having diffraction grating or hologram interference fringes recorded in a relief form is used as a press die, a coating composition of the aforesaid resin is coated on the transparent substrate 2 by means of gravure coating, roll coating or bar coating to form a coating film, and the aforesaid master put over that coating film is heated and compressed by a heating roll or the like. In the alternative, it may be formed through the use of a photopolymer; the photopolymer is coated on the transparent substrate 2 in the same manner, and the aforesaid master put over the photopolymer is irradiated with laser light for copying.

The reflective metal layers 5 are provided to enhance the efficiency of diffraction of the fine hologram relief, and may be formed of reflective metals such as Al, Cr, Ti, Fe, Co, Ni, Cu, Ag, Au, Ge, Mg, Sb, Pb, Cd, Bi, Sn, Se, In, Ga or Rb as well as their oxides or nitrides that may be used alone or in combination of two or more. For the sake of convenience, the oxides or nitrides of reflective metals are also embraced in the term "reflective metal". Of these metals, Al, Cr, Ni, Ag or Au is most preferred. The reflective metal layers 5 have a thickness of preferably 1 to 10,000 nm, and more preferably 2 to 200 nm.

Besides, any thin film for the formation of a transparent hologram may also be used for the reflective metal layers 5 if it is transparent to light thereby developing the holographic effect. For instance, there is the mention of a transparent material different in the index of refraction from the resin of the hologram-formation layer. In that case, the index of refraction may be either higher or lower than that of the resin of the hologram-formation layer; however, the difference in the index of refraction is desirously at least 0.1, more desirously at least 0.5, and most desirously 1.0 or greater. In addition, there is a metallic reflecting film of up to 20 nm in thickness. The preferably used transparent type thin film includes that of titanium oxide ($TiO_2$), zinc sulfide (ZnS), Cu•Al composite metal oxides, and so on. Although it is preferable that the reflective metal layers 5 are formed by thin-film formation techniques such as vacuum evaporation, sputtering, and ion plating, they may also be formed by printing from a metallic ink containing metallic pigments.

The reflective metal layers 5 may be formed in a patterned configuration by various processes. For instance, when the reflective metal layers 5 are formed, they may be patterned by implementing the aforesaid thin film formation process through a pattern mask or a printing process. Alternatively, once a uniform reflective metal layer has been formed, unnecessary portions may be removed from it as described below.

As shown in FIG. 5, the patterning of the reflective metal layers 5 may be implemented using a water-soluble resin pattern. Note here that in FIG. 5 as well as FIG. 6 referred to in the following description, other layers than the hologram-formation layer 4, e.g., the transparent substrate 2 and the cholesteric liquid crystal layer 3 are left out.

Figure 5A:
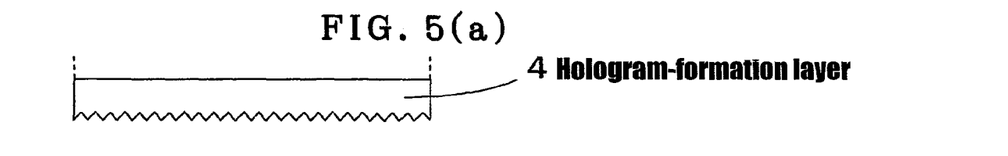
Figure 5B:
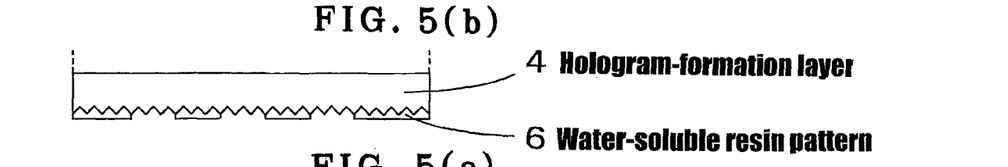
Figures 5C, 5D:
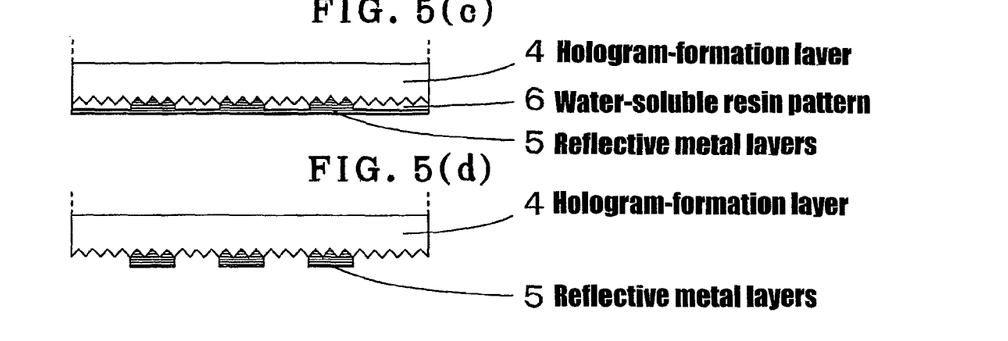
Figure 6A:
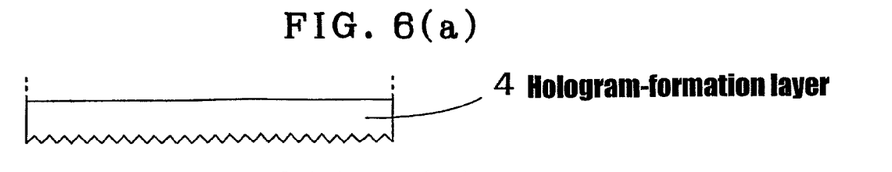
Figure 6B:
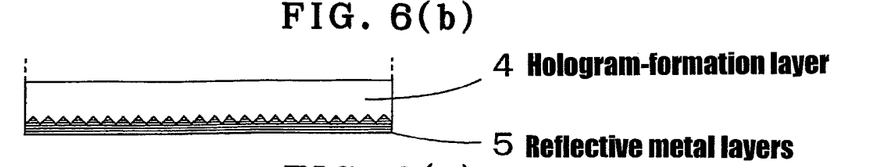
Figure 6C:
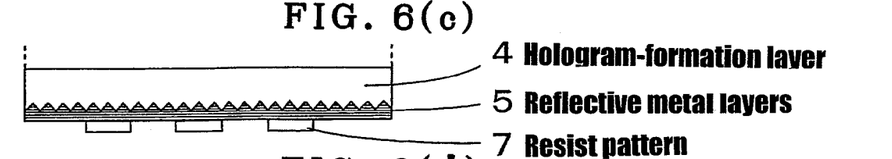
Figure 6D:
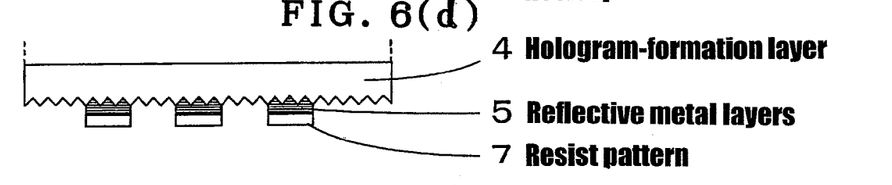

As shown in FIG. 5(a), first, there is the hologram-formation layer 4 provided that has a fine hologram relief formed on the bottom surface. Then, as shown in FIG. 5(b), a water-soluble resin pattern 6 is formed at portions of the surface of the hologram-formation layer 4 with the fine relief formed on it, on which the reflective metal layers 5 are unnecessary. The formation of the water-soluble resin pattern 6 is implemented by a printing or other process using a water-soluble composition obtained by the dissolution or dispersion of a water-soluble resin or water-swelling resin, i.e., the so-called water-soluble ink. Then, as shown in FIG. 5(c), the reflective metal layers 5 are formed all over the surface having the water-soluble resin pattern 6 formed on it. Then, water, an acidic or alkaline aqueous solution or the like is brought into contact with the surface with the reflective metal layers 5 formed on it to remove the water-soluble resin pattern 6 and eliminate the reflective metal layers 5 on portions on which the water-soluble resin pattern 6 is laminated. In this way, as shown in FIG. 5(d), there are the reflective metal layers 5 remaining on the portions on which the water-soluble resin pattern 6 is not laminated: the reflective metal layers 5 are patterned.

As shown in FIG. 6, the patterning of the reflective metal layers 5 may also be implemented using a resist pattern. As shown in FIG. 6(a), first, there is the hologram-formation layer 4 provided that has a fine hologram relief formed on its bottom surface. Then, as shown in FIG. 6(b), the reflective metal layer 5 is formed all over the surface of the hologram-formation layer 4 having the fine relief formed on it. Then, as shown in FIG. 6(c), a resist pattern 7 is formed on portions of the bottom surface of the reflective metal layer 5, on which the reflective metal layers 5 are necessary. Then, an etching solution is allowed to act on the surface having the resist pattern 7 formed on it to etch off the reflective metal layer 5 on portions not covered with the resist pattern 7. In this way, as shown in FIG. 6(d), the reflective metal layers 5 remain on the portions covered with the resist pattern 7: the reflective metal layers 5 are patterned. Note here that the resist pattern 7 remaining on the patterned reflective metal layers 5 is allowed to stay there; however, when it is desired to remove off them, they may be eliminated off by dissolution or the like.

If anything, the aforesaid process using the water-soluble resin pattern or resist pattern is better fit for the fabrication of a multiplicity of authenticating media 1 having the same pattern.

The patterning of the reflective metal layers 5 may also be achieved by a process other than the aforesaid various processes, wherein the reflective metal layer 5 is partially heated to remove off a part of it by melting or evaporation. For instance, this may be achieved by heating with a laser head or irradiation with laser light. This process may be implemented after the fabrication of the authenticating medium 1 and, if anything, it is better fit for the patterning based on individual information.

The aforesaid various patterning processes for the patterning of the reflective metal layers 5 may be used alone or in any combination of two or more.

The adhesive layer is provided to make sure the adhesion of the authenticating medium 1 to a variety of articles; that is, for the adhesive forming part of the adhesive layer, it is preferable to use an adhesive that enhances the adhesion between the reflective metal layers 5 and the hologram-formation layer 4, and makes sure a strong bonding to an application article. Specifically, there is the mention of vinyl chloride resin, vinyl acetate resin, vinyl chloride/vinyl acetate copolymer resin, acrylic resin, polyester resin, polyurethane resin, polyamide resin, rubber-modified products, and so on, from which a suitable one or ones may be selected. The adhesives may be used alone or in admixture of two or more and, if necessary, with hard resin, plasticizers and other additives added to them. In addition, use may also be made of polyacrylate resins, and rubber base self-adhesives. When the adhesive layer is formed of a self-adhesive, it is preferable to apply releasable plastics or papers to the surface of the self-adhesive.

The inventive authenticating medium 1 may be used by itself, and when it is applied to a suitable article in need of authentication, it is possible to determine whether or not that article is genuine.

Figure 7A:
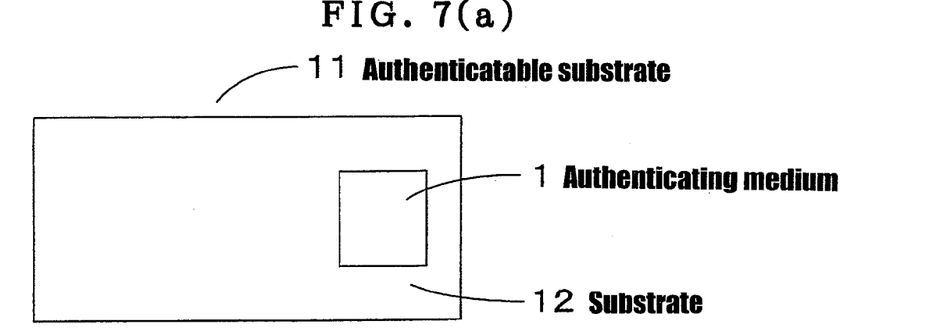
Figure 7B:
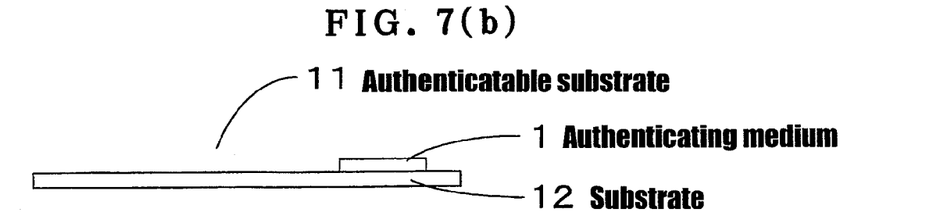

As shown in FIG. 7, the authenticating medium 1 may be laminated on a suitable substrate 12 into an authenticatable substrate 11. FIG. 7(a) is a plan view, and FIG. 7(b) is a front view. Lamination may be implemented by appropriate processes. For instance, if there is an authenticating medium used that has an adhesive layer laminated on the bottom surface of the reflective metal layers 5, lamination can then be implemented using that adhesive layer. When there is an authenticating medium used that has none of that adhesive layer, the adhesive layer is applied to at least one of the surfaces of the substrate 12 and authenticating medium 1 at which they are bonded to each other, if required.

Figure 8A:
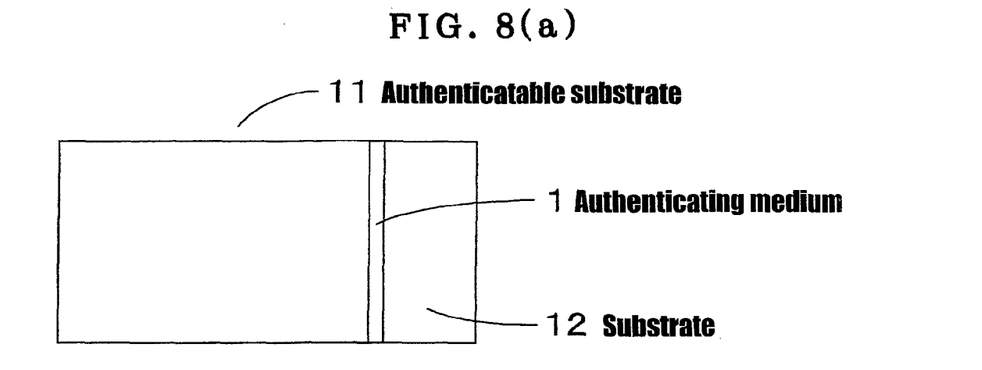
Figure 8B:
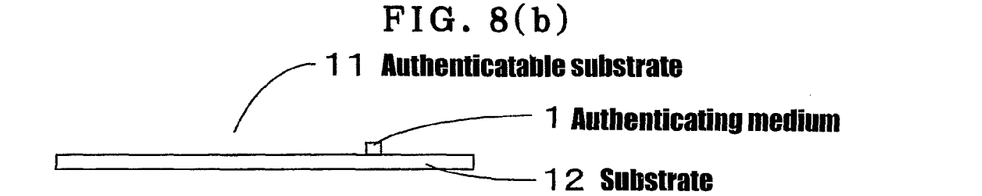

As shown in the plan view of FIG. 8(a) and the front view of FIG. 8(b), the authenticating medium 1 may be processed into a tape or thread form having a very narrow width of, e.g., about 0.2 mm to 5 mm, which is laminated on the upper surface of a substrate 12 into an authenticatable substrate 11.

Figure 9A:
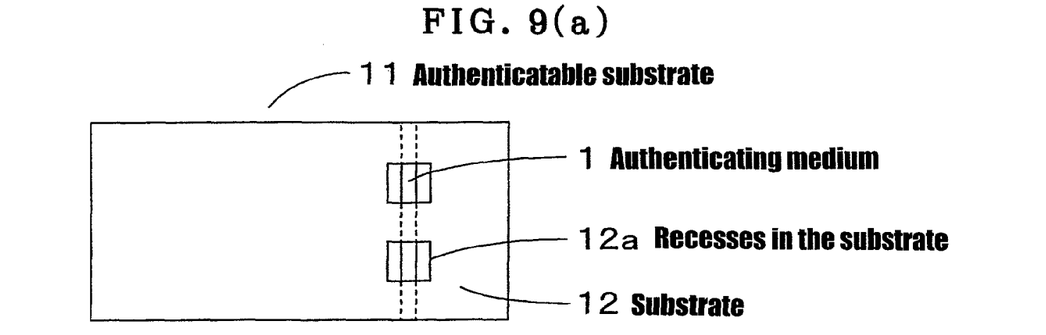
Figure 9B:
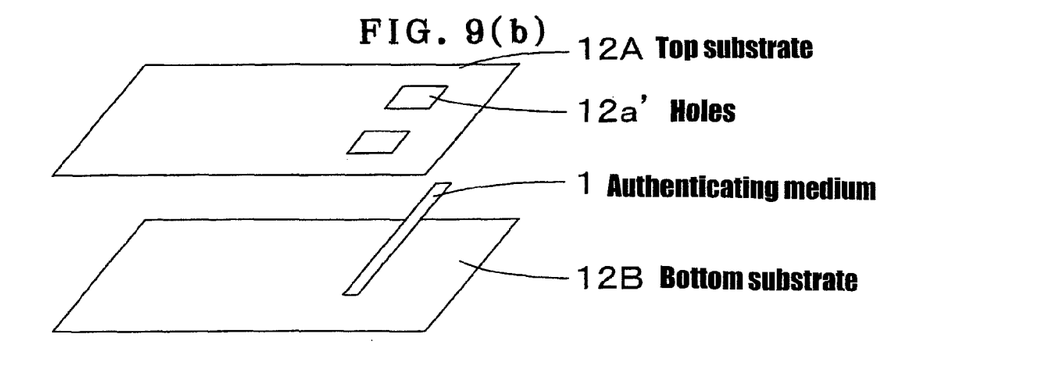

The thread form of authenticating medium 1 may have a part thereof coming out of the bottom of a recess 12a formed in the surface of the substrate 12, as shown in the plan view of FIG. 9(a). More specifically, as shown in the perspective view of FIG. 9(b), a top substrate 12A having a hole (through-hole) 12a' through it and a bottom substrate 12B having no hole are readied up. Then, the top and bottom substrates 12A and 12B are laminated with the thread form of authenticating medium 1 sandwiched between them into a multilayer structure wherein the hole 12a' through the top substrate 12A creates the recess 12a in the upper surface of the substrate 12 so that a part of the authenticating medium 1 comes out of the bottom of the recess 12a, and another part remains buried in the rest of the substrate 12. Such a multilayer structure makes the adhesion between the authenticating medium 1 and the top substrate 12A much better, and makes sure the visibility of the authenticating medium 1. When the top substrate 12A is thin or transparent, the authenticating medium 1 can then be seen through the top substrate 12A even at a site where the authenticating medium 1 remains buried in the substrate 12.

The merit of the inventive authenticating medium 1 grows much higher when it is applied or otherwise pasted to a variety of articles in need of authentication. There is a wide spectrum of articles in need of authentication including the following ones, although the level of authentication in need is variable.

That is, a variety of articles in need of authentication, for instance, include ID cards that identify the holders as the persons in question, tradable coupons, genuine products, and name-brand goods of high rank. The ID cards refer typically to passports, bank cards, credit cards, driving licenses, health insurance cards, book cards (for borrowing books from libraries), etc. The tradable coupons refer typically to tickets for traffic facilities, paper currency, securities, stocks and bonds inclusive of vouchers and gift certificates, bet slips for government-controlled or municipally operated gambling, etc. The genuine products refer typically to products that must be identified to be genuine, e.g., parts, expendables, etc. used for various equipments, and articles, e.g., expendables used for electronic equipments, electric equipments, computer equipments, printers or the like (papers, ink cartridges, toner cartridges, etc.), pharmaceuticals, chemicals, and so on. The brand goods of high rank refer typically to name-brand, usually expensive goods, e.g., watches, clothing, bags, jewelry, sporting goods, and cosmetics. In addition, media having computer software, music software and image software recorded in them, too, are mentioned as the articles in need of authentication.

Thus, the substrate 12 in the inventive authenticatable substrate 11 may be the aforesaid articles themselves or casings for them, and the authenticating medium may be applied or otherwise pasted to them. Alternatively, it may be tagged or otherwise tied to them.

Example 1

A coating composition of cholesteric liquid crystals was coated on one surface of a 50 μm thick PET film, and then successively dried and irradiated with ultraviolet radiation to form a cholesteric liquid crystal layer.

An acrylic resin coating material was coated on the opposite surface of the PET film with no cholesteric liquid crystal formed on it to form a uniform resin layer that was in turn thermally embossed to form a fine hologram relief. An ink of water-soluble resin was printed by gravure printing all over the surface of the formed fine relief but the site necessary for evaporation of aluminum to be formed at the next step, thereby forming a pattern of water-soluble resin. After printing, a thin film of aluminum was uniformly formed by evaporation all over the surface of the fine relief with the pattern of water-soluble resin formed on it, and then washed with water to remove the thin film of aluminum at the site with the pattern of water-soluble resin formed on it together with the pattern of water-soluble resin, thereby forming the pattern comprising the aluminum thin film as an authenticating medium. With the obtained authenticating medium, the hologram could be viewed at the site where there was the aluminum thin film, and the effect of changing in colors depending on the angle of viewing could be obtained at the site where there was none of aluminum.

A self-adhesive was coated on the side of that authenticating medium with the aluminum thin film found, and release paper was put over the coated surface of the medium, which could then be punched out into a suitable form of label. After the release paper was peeled off, the label could be pasted to a variety of articles. When a heat-sensitive adhesive layer was coated in place of the self-adhesive and release paper, heating and pressurization could be applied with the heat-sensitive adhesive layer located as the substrate side of the paper or plastic of an application article so that thermo-compression was achievable. In addition, an assembly comprising heat-sensitive adhesive layers provided on both sides of the authenticating medium and processed by a slitter into a width of 2 mm could be processed into paper in which threads were inserted between paper layers of paper.

Example 2

An ink of water-soluble resin was printed by silk screen printing on the formed hologram except a specific design portion to form a pattern of water-soluble resin. Otherwise, Example 1 was repeated to obtain an authenticating medium. With the obtained authenticating medium, the specific design portion of the hologram could be viewed, and the effect of changing in colors depending on the angle of viewing could be obtained at the site where there was none of aluminum.

Example 3

Example 1 was repeated to form the fine hologram relief. After that, a thin film of aluminum was uniformly formed by evaporation all over the surface of the formed fine relief, and an etching resist ink was printed by gravure printing on the formed aluminum thin film in a configuration conforming to the specific design portion of the formed hologram, thereby forming an etching resist pattern. After the formation of the etching resist pattern, a 1% NaOH aqueous solution was used to implement etching, thereby getting rid of an unnecessary portion of the aluminum thin film and so obtaining an authenticating medium. With the obtained authenticating medium, the specific design portion of the hologram could be viewed, and the effect of changing in colors depending on the angle of viewing could be obtained at the site where there was none of aluminum.

Example 4

Example 1 was repeated to form the cholesteric liquid crystal layer. After that, an ink of cholesteric liquid crystals was printed by gravure printing on the cholesteric liquid crystal layer. After printing, drying and irradiation with ultraviolet radiation were implemented in order to form a cholesteric liquid crystal pattern layer.

After the formation of the cholesteric liquid crystal layer and cholesteric liquid crystal pattern layer, an acrylic resin coating material was coated, as in Example 1, on the opposite surface of the PET film with none of these layers formed on it, thereby forming a uniform resin layer. Then, the resin layer was thermally embossed on its surface to form a fine hologram relief.

An ink of water-soluble resin was printed by silk screen printing over all the surface of the formed fine relief but the formed specific hologram design portion, thereby forming a pattern of water-soluble resin. After printing, a thin film of aluminum was uniformly formed by evaporation all over the surface of the fine relief with the pattern of water-soluble resin formed on it, and then washed with water to remove the thin film of aluminum at the site with the pattern of water-soluble resin formed on it together with the pattern of water-soluble resin, thereby forming the pattern comprising the aluminum thin film as an authenticating medium. With the obtained authenticating medium, the hologram could be viewed at the site where there was the aluminum thin film, and the effect of changing in colors depending on the angle of viewing could be obtained at the site where there was none of aluminum. In addition, at the site based on the cholesteric liquid crystal pattern layer, the effect of changing in colors depending on the angle of viewing could be obtained; unlike the surrounding site composed only of the cholesteric liquid crystal layer, however, there were two ways of color changing.

Example 5

Example 1 was repeated to form the cholesteric liquid crystal layer. After that, a coating composition of cholesteric liquid crystals having another color was coated on the opposite surface of the PET film with none of the cholesteric liquid crystal layer formed on it. Thereafter, drying and irradiation with ultraviolet radiation were implemented in order to form another cholesteric liquid crystal layer.

An acrylic resin coating material was coated on the another cholesteric liquid crystal layer to form a uniform resin layer, which was then thermally embossed on its surface to form a fine hologram relief.

As in Example 4, a pattern of water-soluble resin was formed on the surface of the formed fine relief, an aluminum thin film was then uniformly formed, and washing with water was carried out to form a pattern comprising an aluminum thin film as an authenticating medium. With the obtained authenticating medium, the specific design portion of the hologram could be viewed, and at the site where there was none of aluminum, there were two different ways of color changing based on the presence of both the cholesteric liquid crystal layers and depending on the angle of viewing.

What is claimed is:

1. An authenticating medium, characterized by comprising a cholesteric liquid crystal multilayer structure comprising at least two cholesteric liquid crystal layers laminated on at least a viewing side of a transparent substrate, wherein a hologram-formation layer having a fine hologram relief formed on a surface of a transparent resin layer is laminated on a non-viewing side of said cholesteric liquid crystal multilayer structure, and reflective metal layers are laminated in a pattern form on a surface of said hologram-formation layer with the fine relief formed on it, and at least a part of one of said cholesteric liquid crystal layers being in a patterned form.

2. The authenticating medium according to claim 1, characterized in that an adhesive layer is laminated on said reflective metal layers side.

3. The authenticating medium according to claim 1, characterized in that the authentication medium has said reflective metal layers laminated on another substrate.

4. The authenticating medium according to claim 1, wherein the authentication medium is visibly buried in another substrate.

* * * * *